United States Patent [19]

Gustafson

[11] Patent Number: 5,421,161
[45] Date of Patent: Jun. 6, 1995

[54] STORAGE SYSTEM FOR CRYOGENIC FLUIDS

[75] Inventor: Keith W. Gustafson, Waleska, Ga.

[73] Assignee: Minnesota Valley Engineering, Inc., New Prague, Minn.

[21] Appl. No.: 127,330

[22] Filed: Sep. 27, 1993

[51] Int. Cl.$^6$ .............................................. F25B 19/00
[52] U.S. Cl. .......................................... 62/7; 62/50.4; 123/525; 123/527
[58] Field of Search ................... 62/7, 50.4; 123/525, 123/527

[56] References Cited

U.S. PATENT DOCUMENTS

| | | | |
|---|---|---|---|
| 2,456,890 | 12/1948 | St. Clair | 62/50.4 |
| 2,645,906 | 7/1953 | Ryan | 62/50.4 |
| 2,747,374 | 5/1956 | Thompson | 62/50.4 |
| 2,964,919 | 12/1960 | Howlett | 62/50.4 |
| 3,001,375 | 9/1961 | Tauscher | 62/50.4 |
| 4,625,753 | 12/1986 | Gustafson | 62/7 |
| 4,956,975 | 9/1990 | Gustafson | 62/7 |
| 5,136,852 | 8/1992 | Neeser et al. | 62/7 |

*Primary Examiner*—Ronald C. Capossela
*Attorney, Agent, or Firm*—Rockey, Rifkin and Ryther

[57] ABSTRACT

A relief valve is provided in the dip tube line that provides a fixed back pressure of 2-3 psi. When the economizer valve on the economizer circuit opens, the back pressure in the dip tube is the head pressure plus the 2-3 psi created by the relief valve. This pressure creates a path of least resistance through the economizer circuit such that the demand of product will draw gas from the gas head via the economizer line until the pressure falls below the valve set at the regulator. Once the pressure falls below the valve set at the regulator, the regulator closes the economizer circuit and liquid will be drawn through the dip tube. Because the relief valve prevents flow back into the tank, an orifice is provided to allow back flow of the cryogen from the withdrawal line to the tank once delivery of product is stopped.

14 Claims, 2 Drawing Sheets

STORAGE SYSTEM FOR CRYOGENIC FLUIDS

BACKGROUND OF THE INVENTION

The invention relates, generally, to cryogenic fluid storage and delivery systems and, more particularly, to an improved economizer system for horizontal storage tanks.

The typical cryogenic delivery and storage system is illustrated in FIG. 1 and includes a relatively large, vertically disposed storage tank 2. The typical storage tank is three to four feet tall and includes a double-walled, thermally insulated construction that holds a supply of liquid cryogen 4. As will be appreciated, even though tank 2 is insulated, heat leak will occur such that the liquid cryogen will slowly vaporize to create a gas head 6.

To deliver product from the tank 2 a dip tube 8 extends into the liquid 4 and is connected to a gas use device via a withdrawal line 10. A vaporizer 12 located in the withdrawal line 10 heats the liquid and vaporizes it before it is delivered to the use device.

Because heat is continuously transferred to the liquid in the tank, a portion of the liquid will vaporize thereby increasing the pressure in the tank. Where the tank stands idle for an extended period, the pressure rise in the tank can be relatively great. As will be appreciated, the pressure in tank 2 must be released to minimize the possibility of the tank or the associated plumbing from bursting or otherwise being damaged. One method to relieve pressure is simply to vent the gas to atmosphere; however, this procedure is wasteful and can be hazardous.

As an alternative to venting to atmosphere, an economizer circuit 14 has been developed as illustrated in FIG. 1. The economizer circuit 14 includes a line 16 connecting the gas head 6 to the withdrawal line 10. A regulator 18 located in line 16 will allow vapor to be delivered to the use device from gas head 6 when the pressure in the tank rises above the predetermined level set at regulator 18. By pulling vapor from gas head 6, instead of liquid through the dip tube 8, the pressure in tank 2 falls dramatically.

In the vertical tanks of the prior art (where the dip tube 8 is relatively long) gas is delivered via economizer line 16 whenever regulator 18 is open because the pressure head created by pulling liquid up the long dip tube makes gas flow out of the economizer circuit the preferred path. In other words when regulator 18 is opened and a demand for product is made, the path of least resistance is through economizer line 16 because of the pressure head of dip tube 8. Specifically, in the typical 3 to 5 foot tall vertical tank filled with liquid natural gas (LNG), the pressure head created in dip tube 8 is 1 to 2 psi. The head pressure varies with liquid density such that a heavier liquid such as argon (Density: 11.6 pounds per gallon) will generate four times the head pressure of LNG (Density: 3.5 pounds per gallon) at the same liquid height. Thus, these problems are more acute for light cryogens such as LNG. Because of the head pressure in the dip tube, the resistance to flow in the economizer line is 1 to 2 psi lower than the resistance to flow in the dip tube such that economizer line 16 will initially deliver gas to the use device thereby lowering the pressure in the tank until the pressure falls below the value set at regulator 18 at which time regulator 18 will close and liquid will be delivered via dip tube 8.

As will be appreciated, the pressure head on dip tube 8 will decrease as the dip tube is made shorter until at some length the pressure head on the dip tube will be negligible. When this occurs the opening of regulator 18 and the demand for product will result in liquid being delivered from dip tube 8 simultaneously with or in place of gas being delivered from economizer line 16. Moreover, high flow demand has the same effect as a short dip tube (i.e. the pressure head on the dip tube is negligible) because high flow causes a pressure drop in the line larger than the difference in head pressure. Under such circumstances, the pressure in tank 2 cannot be quickly or effectively be lowered.

Thus, an improved economizer system for horizontal cryogen storage tanks is desired.

SUMMARY OF THE INVENTION

The invention resides in an improved economizer system for use on horizontal tanks such as those used as fuel tanks on vehicles. A relief valve is provided in the dip tube line that provides a fixed back pressure of 2 to 3 psi. When the economizer valve on the economizer circuit opens, the back pressure in the dip tube is the head pressure plus the 2 to 3 psi created by the relief valve. This pressure creates a path of least resistance through the economizer circuit such that the demand for product will draw gas from the gas head via the economizer line until the pressure falls below the value set at the regulator. Once the pressure falls below that value, the regulator closes the economizer circuit and liquid will be drawn through the dip tube. Because the relief valve prevents flow back into the tank, an orifice is provided to allow product trapped in the withdrawal line to return to the bottom of the tank once delivery of product is stopped.

DETAILED DESCRIPTION OF THE INVENTION

Figure 2:
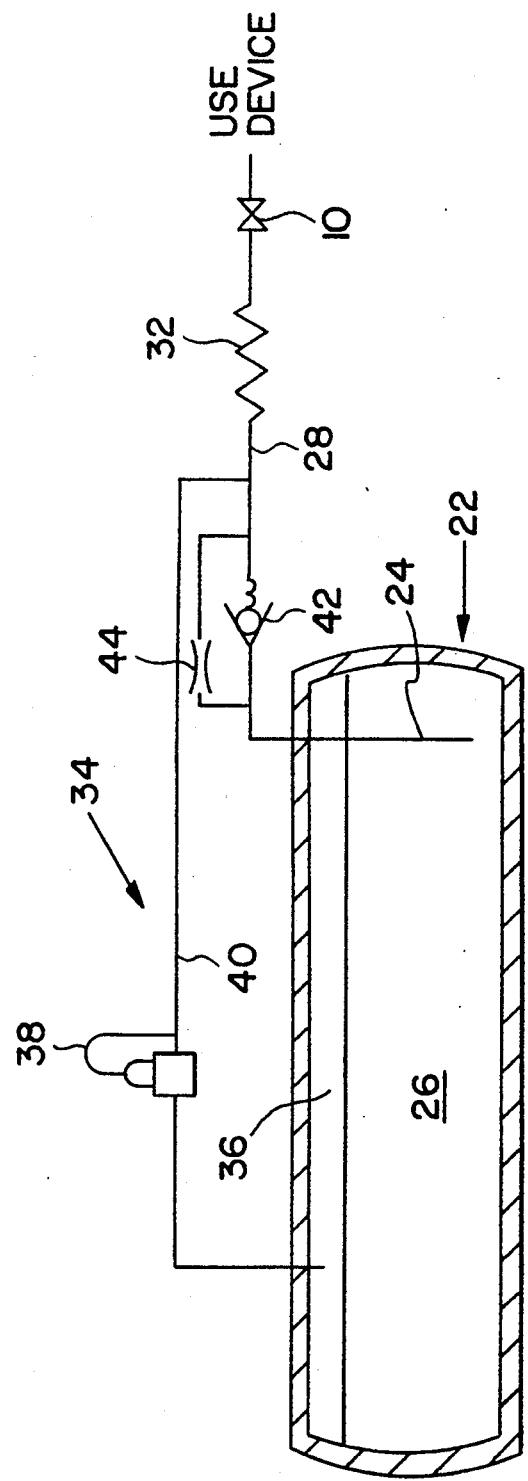
FIG. 2 is a schematic view of the economizer circuit of the invention.

Referring more particularly to FIG. 2, the economizer system of the invention is particularly useful on horizontal storage tanks shown generally at 22. Horizontal storage tanks are commonly used as fuel tanks on vehicles where the tank is mounted to the underside of the vehicle and stores liquid natural gas (LNG) that fuels the vehicle's engine. The tank preferably has a double-walled, thermally insulated construction as will be appreciated by one skilled in the art. These tanks have a total height of only approximately 10 to 20 inches, significantly less than the 3 to 5 feet of the vertical storage tanks common in the prior art. Moreover, fluid density in vehicle mounted tanks is less than in large, stationary tanks.

A dip tube 24 extends from the top of tank 22 to near the bottom of the tank for delivering liquid cryogen such as LNG 26 to the gas use device. A product withdrawal line 28 connects the dip tube 24 with the gas use device. In a preferred use, the gas use device is a vehicle engine where the demand for gas is controlled by valve 10 which is controlled by the vehicle's throttle or gas pedal. A heat exchanger or vaporizer 32 is located in withdrawal line 28 to vaporize the LNG before it is delivered to the use device.

An economizer circuit 34 includes a line 40 connecting vapor head 36 with withdrawal line 28 and includes a regulator 38. The regulator 38 is set to open at a predetermined maximum pressure. Thus, when heat leak to the LNG causes the liquid in the tank to vaporize the pressure in the tank will increase. When the pressure in the tank reaches the value set at regulator 38, the regulator will open to allow gas in vapor head 36 to be delivered to the use device thereby to lower the pressure in the tank.

The problem with such a design in horizontal tanks using LNG or other light cryogens is that the pressure head or back pressure in the dip tube 24 is on the order of 0.2 psi due to its short length. This back pressure is approximately equal to the back pressure of the economizer circuit 34. As result, the economizer circuit 34 is not a path of least resistance. Thus, liquid will continue to be delivered through dip tube 24 even with regulator 38 open. Accordingly, only a small amount of gas is delivered from vapor head 36 such that it takes a long period of fluid delivery to sufficiently lower the pressure in tank 22. For example, it has been shown to take one hour to lower the pressure 100 psi using a prior art economizer system on a horizontal tank. For a vehicle in stop and go traffic or a vehicle that is not driven a long distance, the economizer circuit may never lower the pressure in the tank to the desired level. In such circumstances, the gas must be vented resulting in a loss of product and a potentially dangerous situation.

To eliminate this problem, in the system of the invention the withdrawal line 28 is provided with a pressure relief valve 42. Pressure relief valve 42 is selected to provide a back pressure of 2 to 3 psi in the dip tube 24. It should be noted that any device for increasing the back pressure on the dip tube 24 can be used including an automatic valve or a restricted orifice. Thus, when regulator 38 opens due to a pressure increase in tank 22, the back pressure in the dip tube will be at least 2 to 3 psi greater than the back pressure in the economizer circuit 34. The product in tank 22 will take the path of least resistance such that gas will flow from vapor head 36 through economizer line 40 to the use device until the pressure in the system falls below the pressure set at regulator 38. Once regulator 38 closes, liquid will be delivered via dip tube 24 through pressure relief valve 42 to the use device. Using the system of the invention the pressure in the tank can be lowered by about 100 psi in 5 minutes.

Figure 1:
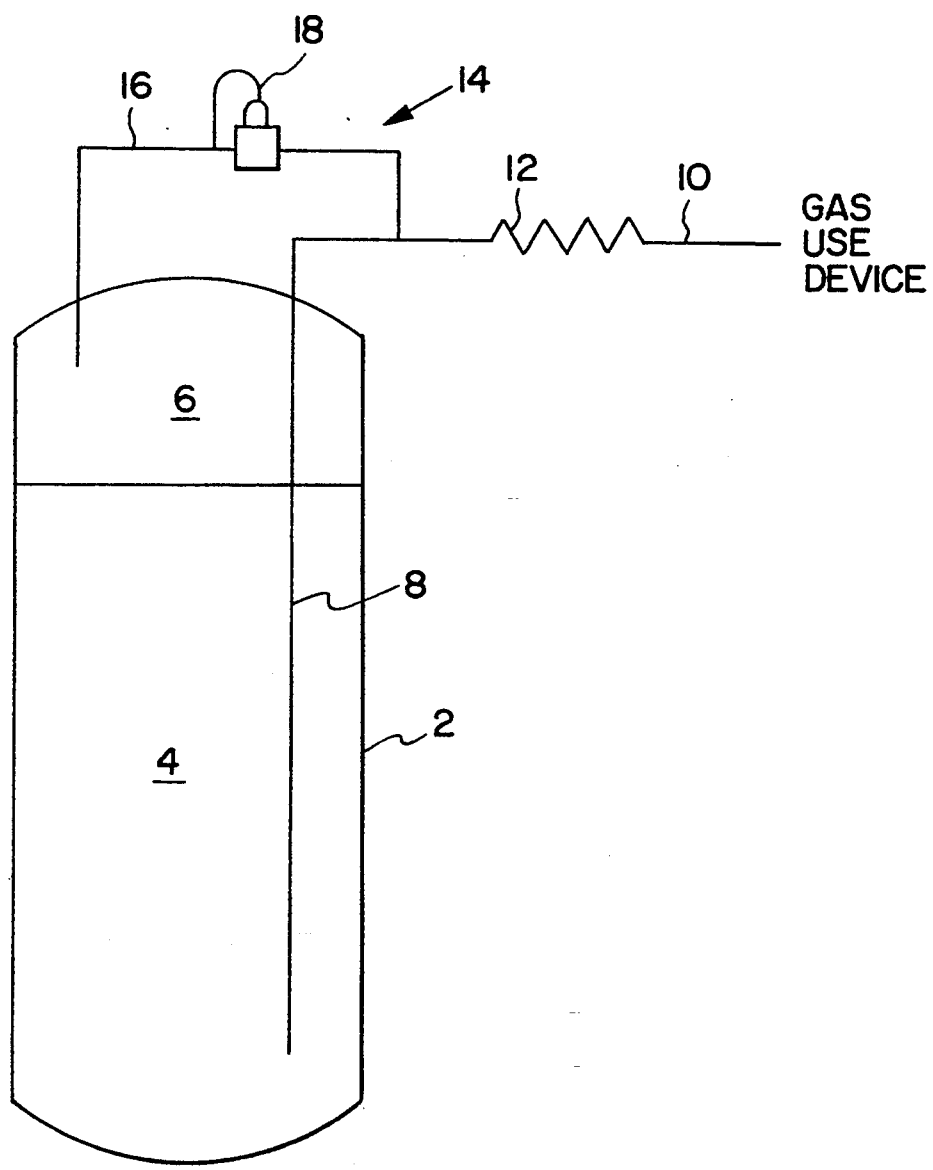
FIG. 1 is a schematic view of the prior art economizer circuit.

When demand for the product stops and valve 42 is closed, LNG will be trapped in the withdrawal line 28. Heat transfer to the LNG in the line will cause it to expand thereby increasing the pressure in the line. To prevent the pressurized vapor from damaging the withdrawal line and associated plumbing, it is necessary to remove the vapor from the line 28. In the prior art system, as illustrated in FIG. 1, the dip tube was an open path back to the tank 2 such that vapor in line 10 would simply be forced into tank 2 via the dip tube upon cessation of fluid delivery.

Because the pressure relief valve 42 in the system of the invention prevents flow back to tank 22, the pressure in withdrawal line 28 can not be released as in the prior art systems. Thus, a small orifice 44 is provided in the withdrawal line to bypass the pressure relief valve 42 and allow back flow to the bottom of tank 22. The orifice is on the order of 0.02 to 0.03 inches in diameter such that it allows back flow of the high pressure gas without creating a low resistance path for the LNG to exit the tank.

Moreover, as shown in FIG. 2, in the preferred embodiment the regulator 38 of the invention is reversed from the regulator 18 of the prior (shown in FIG. 1) such that it senses the pressure in line 28 rather than sensing pressure in the tank. As a result, should orifice 44 fail, regulator 38 will sense the build up of pressure in line 28 and will open to allow gas to flow back into the top of the tank. Thus, the reversing of regulator 38 serves as an emergency relief valve to vent gas from line 28 back to the tank in the event of large pressure build up. The regulator 38 can be arranged in the same orientation as regulator 18 in the prior art device of FIG. 1, if the emergency pressure relief function is not desired.

While the invention was described in some detail with respect to the drawings, it will be appreciated that numerous changes in the details and construction of the device can be made without departing from the spirit and scope of the invention.

What is claimed is:

1. An improved delivery system for a tank containing a liquid cryogen, comprising:
    (a) a tank containing a liquid body and a gas head, said gas head creating a pressure in the tank;
    (b) a withdrawal line for delivering cryogen to a use device;
    (c) a dip tube extending into the liquid body and connecting the liquid body with the withdrawal line whereby when the withdrawal line is open, the pressure in the tank forces liquid out the dip tube and withdrawal line;
    (d) an economizer line connecting the gas head with the withdrawal line and including a regulator for opening the economizer line when the pressure in the tank exceeds a predetermined value to deliver gas from the gas head to the withdrawal line to quickly lower the pressure in the tank; and
    (e) a pressure relief valve for providing back pressure on the dip tube in excess of the pressure head created by the length of the dip tube whereby the path of least resistance is through the economizer line whenever the regulator is open.

2. The system according to claim 1, wherein the tank is thermally insulated.

3. The system according to claim 1, wherein the use device is a vehicle engine.

4. The system according to claim 1, wherein the tank is mounted on a vehicle.

5. The system according to claim 1, wherein the tank is a horizontal tank.

6. The system according to claim 1, further including means for allowing back flow of cryogen from the withdrawal line to the dip tube without materially affecting the back pressure.

7. The system according to claim 1, wherein the means for allowing back flow includes a small diameter orifice bypassing the means for increasing back pressure.

8. The system according to claim 1, wherein the means for increasing back pressure increases the back pressure by about 2 to 3 psi.

9. The system according to claim 1, wherein the withdrawal line includes a vaporizer for converting liquid cryogen to gas.

10. The system according to claim 1, wherein the tank contains LNG.

11. The system according to claim 1, wherein the regulator senses the pressure in the withdrawal line to provide emergency gas relief from said withdrawal line.

12. An improved delivery system for a tank of greater length than height intended to store and dispense a liquid cryogen, comprising:
- (a) a withdrawal line for delivering cryogen from the tank to a use device;
- (b) a dip tube extending into the lower portion of the tank for communicating the liquid body with said withdrawal line;
- (c) an economizer line extending into the upper portion of the tank for communicating the gas head with the withdrawal line and including a regulator for opening the economizer line when the gas pressure in the tank exceeds a predetermined value to deliver gas from the gas head to the withdrawal line;
- (d) a pressure relief valve for creating back pressure in the dip tube in excess of the pressure created by the length of the dip tube in the tank whereby the path of least resistance is through the economizer line whenever the regulator is open; and
- (e) means for allowing back flow of cryogen from the withdrawal line to the dip tube without materially affecting the back pressure.

13. The system according to claim 12, wherein the withdrawal line includes a vaporizer for converting liquid cryogen to gas.

14. The system according to claim 12, wherein the means for increasing back pressure increases the back pressure by about 2-3 psi.

* * * * *